United States Patent [19]
Cabiran

[11] Patent Number: 6,053,683
[45] Date of Patent: Apr. 25, 2000

[54] THREADED SEAL CAP FOR A CONNECTOR

[76] Inventor: Michel Lewis Cabiran, 4111 Placid Stream Ct., Houston, Tex. 77059

[21] Appl. No.: 09/244,946

[22] Filed: Feb. 4, 1999

[51] Int. Cl.[7] .............................. F16B 19/00; F16B 33/00; F16B 37/14

[52] U.S. Cl. ...................... 411/372.6; 411/374; 411/431; 411/910

[58] Field of Search .............................. 411/372.5, 372.6, 411/374, 429, 430, 431, 910

[56] References Cited

U.S. PATENT DOCUMENTS

| | | |
|---|---|---|
| 1,254,514 | 1/1918 | Lehmann . |
| 1,399,698 | 12/1921 | Dodds . |
| 1,498,019 | 6/1924 | Dodds . |
| 1,506,005 | 8/1924 | Kraft . |
| 1,787,105 | 12/1930 | Delany . |
| 2,020,522 | 11/1935 | Seguin ..................................... 411/374 |
| 2,538,483 | 1/1951 | Summers . |
| 2,795,144 | 6/1957 | Morse ...................................... 411/431 |
| 3,881,391 | 5/1975 | Dereszynski . |
| 4,784,555 | 11/1988 | Cantrell . |
| 5,181,817 | 1/1993 | Anderson .............................. 411/372.5 |

FOREIGN PATENT DOCUMENTS

| | | | |
|---|---|---|---|
| 46475 | 3/1909 | Switzerland ............................ 411/374 |
| 527930 | 10/1940 | United Kingdom ................... 411/374 |
| 603268 | 6/1948 | United Kingdom ................... 411/374 |
| 92 07198 | 4/1992 | WIPO ................................. 411/372.6 |

*Primary Examiner*—Neill Wilson
*Attorney, Agent, or Firm*—Andrew S. Pryzant

[57] ABSTRACT

Disclosed are threaded seal caps suitable for sealing the ends of common screw and bolt connectors for various purposes including protective/safety, ornamentation and pressure seals in chemical and physical processes or as a guard for a switch. The seal caps include a threaded inside surface for attachment to washers having a threaded outside surface. The caps can include an o-ring gasket for sealing a pressurized connector. The washers are preferably made from a suitable section of all-thread.

9 Claims, 6 Drawing Sheets

SEC 2-2

THREADED SEAL CAP FOR A CONNECTOR

FIELD OF THE INVENTION

The present invention relates to a threaded seal cap for a connector, and more particularly, the present invention relates to a cap which is screwed over an end of a fastened bolt or screw for sealing the connector.

BACKGROUND OF THE INVENTION

By way of background, covers for bolt and screw connectors have been used in the art for providing an ornamental and/or protective covering for the protruding end of the connector. In carpentry, for example, the bolt can be covered with a decorative cover to hide the presence of the fastener. Sometimes, a well is made for the bolt head and a cover is inserted into the opening.

Alternatively, the cover can comprise spring loaded clips which are snapped into the opening over the bolt. Thus the bolt can be placed out-of-sight for ornamental purposes. Such covers are commonly seen in the manufacture of store fixtures and furniture made of metal and plastic.

Ornamental covers for bolts have a long standing use in the plumbing of toilets, wherein a porcelain cover is used to hide from sight the bolt used to connect the bowl to the floor. See for example, U.S. Pat. No. 2,020,522 to Seguin and U.S. Pat. No. 3,881,391 to Dereszynski.

In Seguin, the cover is attached to a washer by a threaded means. The washer is notched around the periphery to facilitate removal after a long period of time. Thus, the washer includes a groove for inserting a gasket to prevent water from passing through the notches and rusting the bolt. Alternatively, the gasket can be placed over the top side of the notched washer and held in place by a spring loaded flange inside the cap. In the '391 patent, the cover is provided a mounting disc inserted inside. The mounting disk can be screwed to the protruding end of bolt used to fasten the bowl to the floor. However, the cover for the toilet bowl fastening bolt has generally been attached using putty or adhesive.

It has often been desirable to cover the end of a projecting bolt for protective purposes, both to prevent rusting and/or marring of the bolt threads and as a safety precaution. U.S. Pat. No. 2,538,483 to Summers, U.S. Pat. No. 1,254,514 to Lehmann, and U.S. Pat. No. 1,506,005 to Kraft, U.S. Design Pat. No. Des. 311,131 disclose protective covers with internal threads for threadedly receiving the end of a projecting bolt. Similarly, U.S. Pat. No. 4,784,555 to Cantrell has an internal gasket for mounting a nut by means of friction.

Heretofore, threaded caps have not been used to seal bolt and screw connectors. In addition, seal caps have not previously been attached to washers made from all-thread bolt stock.

SUMMARY OF THE INVENTION

A novel, easy to manufacture, screw-on seal cap for a bolt or screw type fastener has been invented. Because the cap is attached by interlocking threads to a washer and a suitable washer can be simply made from a thin section of all-thread with a center drilled hole, the present invention can be used in a wide variety of sealing applications including ornamental and/or protective as well as for providing a pressure seal around a projecting end of the connector. The present invention is a significant improvement over the prior art of non-seal covers fastened, for example, by spring loaded clips, adhesive, putty, by a set screw, and the like non-seal means.

As one embodiment, the present invention provides a seal cap connector assembly for common bolt and screw fasteners having at least one end projecting from an engagement surface for attachment of the seal cap. A washer having a threaded outside surface is attached to the connector projecting end. The cap has a threaded inside surface for attachment to the washer and a hollow interior space for receiving the projecting end. The washer consists essentially of a suitable section of all-thread with an opening formed in the center.

The cap can be provided a groove for receiving a suitable o-ring and the o-ring forms a seal with the engagement surface when the cover is installed. The washer can be provided a chamfered inside edge for evenly distributing the force of the connector thereon.

The connector assembly of the present invention, including the cover, washer and connector can be made of a metal, wood or plastic materials or a combination thereof.

The connector can comprise a bolt having a body extending through a first nut, and the cap is elongated along the axis to receive the extended body. The washer can be attached to the extended body between the first nut and a second nut.

The cap can be received within a well, formed on the engagement surface. In this manner, the seal cap can be employed with a low profile with respect to the engagement surface.

The connector assembly can further include an outer sheath made of a rubber or plastic material for protecting the cover from rain or as a safety feature. In the case of a bolt with two available ends, a seal cap of the present invention can be attached at both ends, if desired.

As another embodiment, the present invention provides a method for sealing a connector or fastener having at least one projecting end. In one step, a washer having a threaded outside surface is attached to the connector projecting end. As another step, a seal cap having a hollow interior space for receiving the projecting end and a threaded inside surface, is fastened to the washer for engaging the seal.

DETAILED DESCRIPTION OF THE INVENTION

A threaded cover for a bolt or screw type connector seals the connector, for example, to help prevent water and air contamination from the outside or minimize leaks of process fluids from the inside. When attached to a washer made from ordinary all-thread, the seal cap can also be used for a wide variety of ornamental and protective applications where it is desirable to mask the presence of the connector or prevent access to a switch.

Heretofore, such ornamental and protective covers have been non-sealing, attached using spring clips, set screws, by frictional means and adhesives. However, such connecting means can be impractical, difficult to use, or can easily fall off. A cover which is screwed on and off is typically easier to use and more reliable in general. The present cover has the additional benefit of providing a seal.

Referring to FIGS. 1–14, wherein like references indicate like parts, standard screw and bolt type connectors and fasteners C are sealed by a cover or cap 1 of the present invention threadably attached thereto.

Typically, standard bolt and screw connectors C comprise a head H having a threaded body B axially extending therefrom wherein the body B is received by an opening O formed in an engagement surface S of an object having portions P, P' fastened by the connector. The opening O can have a threaded inside surface for threadably attaching the body B for engaging the connector C when the connector is a screw. Alternatively, when the connector is a bolt, the body B passes through the opening O' which is typically not threaded and a nut N threadably attaches the body B at a threaded end thereof for engaging the bolt. In another common variation, the bolt body B has dual threaded ends for attaching a nut N at each end thereof for engaging the connector C.

In the practice of the present invention, either or both projecting ends of the connector C can be provided a threaded seal cap 1 to form a sealing cap/connector assembly 10 of the present invention.

The cap 1 of the present invention has an interior space 12 for receiving the head H of the connector C and a threaded inside surface 14 threadably engaging a threaded outside surface 16 of a washer 18 attached to the projecting end of connector C.

In the practice of the present invention, the washer 18 preferably comprises a suitably sized section of all-thread having an opening 20 such as a round hole drilled through the center thereof. As is well known in the art, all-thread also called bolt stock is a bar (not shown) threaded entirely on the outside surface and used to quickly make bolts of variable length for construction applications. The all-thread washer 18 should be suitably thick to provide sufficient threads for securely attaching the cover 1 to provide adequate seal for the purpose at hand and to avoid deformation of the washer when compressed by the head H of connector C when tightened to a fully preloaded position.

Figure 3:
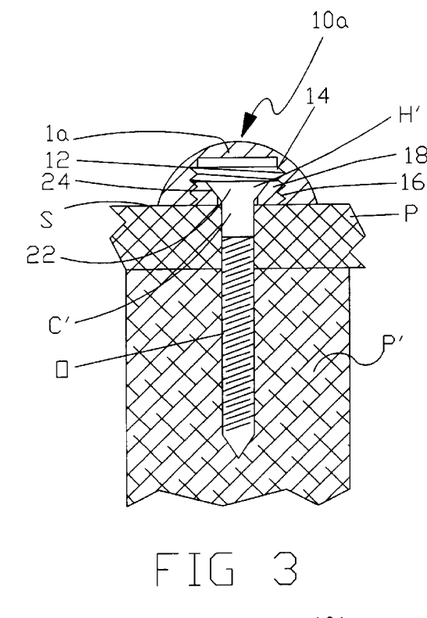
FIG. 3 shows a cross-sectional view of another embodiment of the seal connector assembly of the present invention, wherein the connector comprises a flat head screw.

Several variations in types of connectors and suitable seal covers of the present invention can be seen in FIGS. 2–6. In another embodiment, a hemispherical cap 11a is used to seal a flat head screw C' in a sealed screw assembly 10a. The cap 1a has an interior space 12 for receiving head H' of the screw C' and inside threads 14 for threaded connection to exterior threads 16 of a washer 18' in the manner of the present invention. For a screw having a countersunk surface 22 as seen in FIG. 3, the washer 18' has a matching seat 24.

Figures 3A, 5:
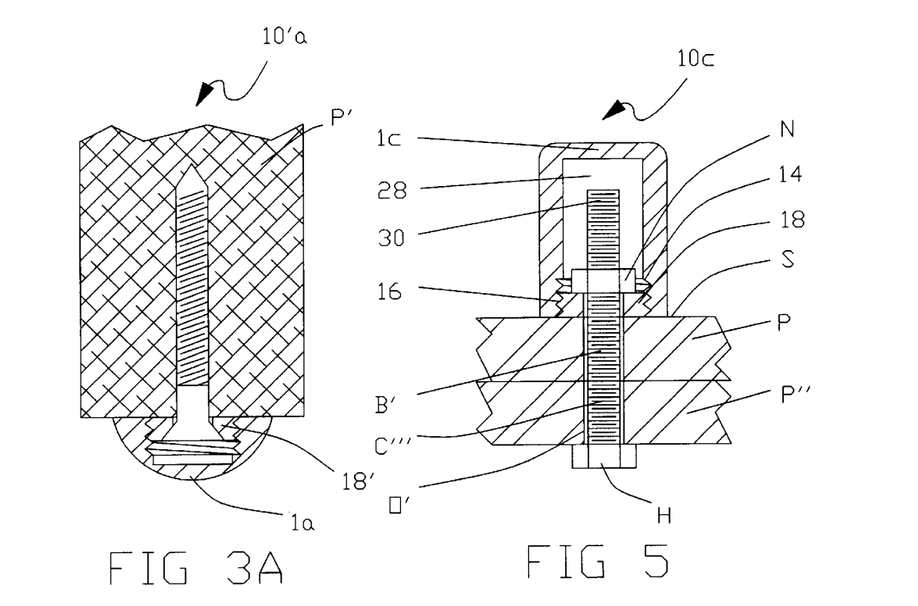
FIG. 3a shows the embodiment of FIG. 3 wherein the seal connector assembly of the present invention is used, for example, as a wear-foot on a leg of a chair or table.
FIG. 5 shows a cross-sectional view of a further embodiment of the seal connector assembly of the present invention, wherein the connector comprises a bolt and the cap is elongated along its axis for receiving the extending portion of the bolt body.
Figure 4:
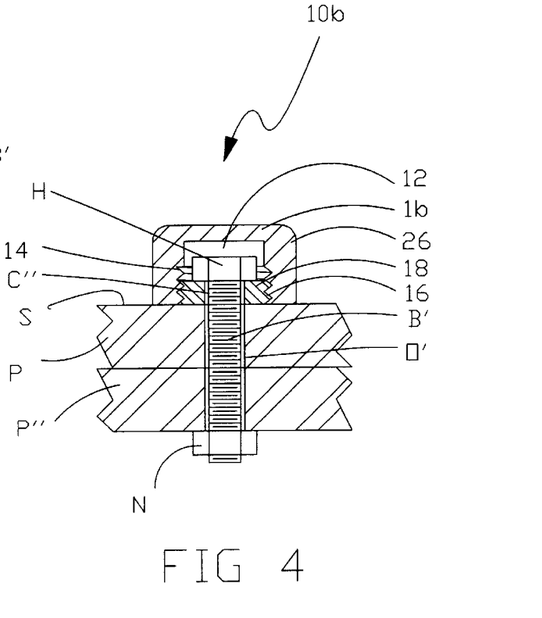
FIG. 4 shows a cross-sectional view of the seal connector assembly of the present invention, wherein the connector comprises a hex-head screw and the cap has a rounded edge.

Referring to FIG. 3a, the cap 1a can comprise a wear-foot of a furniture or equipment leg assembly 10'a.

When the screw C' is fastened to the engagement surface S to connect object portions P, P', the cap 1a is screwed down on the washer 18' to generally seal the screw C' from environmental conditions as well as hide the screw head H' from sight.

Connection means can comprise a bolt connector C" fastened to object portions P, P" by the nut N as seen in FIGS. 4–6 and 8–11, wherein the bolt C" has a threaded body B' extending through on opening O' for threaded connection with the nut N. A cap 1b of a seal assembly 10b is provided a rounded edge 26 to avoid sharp edges and protect from impacts therewith. In industrial or commercial settings, for example, sharp edges can be damaging if impacted by other equipment or people.

Figure 1:
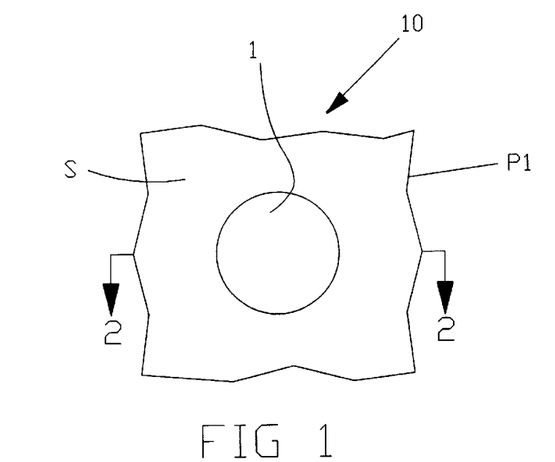
FIG. 1 shows a plan view of a seal connector assembly of the present invention.
Figure 2:
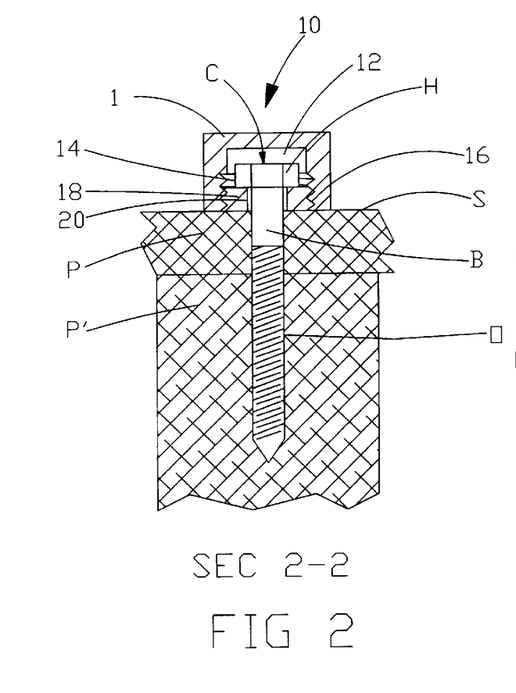
FIG. 2 shows a cross-sectional view of one embodiment of the seal connector or assembly of the present invention as seen along the lines 2—2, wherein the connector comprises a hex-head screw and the cap has a squared edge. By way of cross-section, it is meant sections that are identical when rotated around their central vertical axes.
Figure 2A:
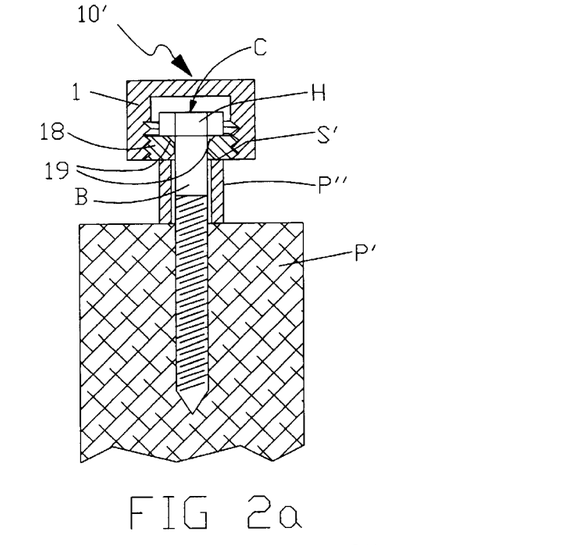
FIG. 2a shows a variation of the seal connector assembly of FIG. 2 with respect to the nature of the connection surface.

As seen in FIG. 2a, an embodiment 10' comprises object portions P', P" fastened by the connector bolt C, wherein portions P', P" are unequal in contact area and a connection engagement surface S' can be limited to contact with the washer 18. This embodiment can be used as a pull knob that may be easily attached from just one surface. As well known in the art, the bolt C typically has fillets disposed between the bolt head H and the bolt shaft B.

Figure 2B:
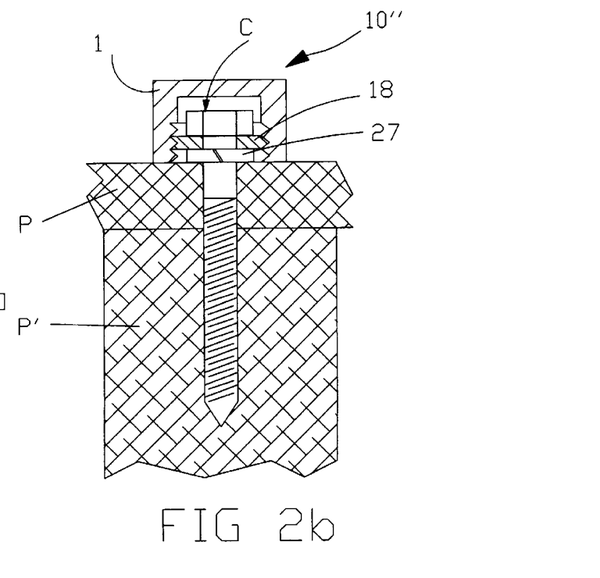
FIG. 2b shows a cross-sectional view of another embodiment of the seal connector assembly of FIG. 2, including a standard lock washer underneath the exteriorly threaded washer.

As seen in FIG. 2b, an embodiment 10" includes a standard split ring lock washer 27 or an externally toothed lock washer (not shown) used to prevent the threaded washer 18 from rotating when unscrewing the cap 1 therefrom. The locking washer 27 is preferably installed in the assembly 10 between the threaded washer 18 and the connection surface S for optimum effectiveness. This usage is novel in the art since lock washers typically are installed beneath the head of a screw to prevent the screw from unscrewing and not underneath a washer since rotation of the washer is not typically a concern.

Figure 6:
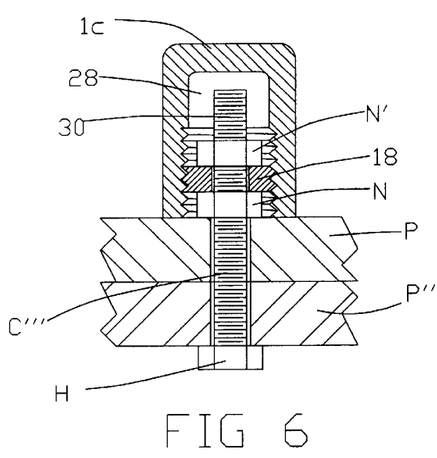
FIG. 6 shows a cross-sectional view of yet another embodiment of the seal connector assembly of the present invention used wherein the washer is attached to the connector between two nuts and the cap is elongated for receiving the extended portion of the screw body.

In a further embodiment of the present invention, as seen in FIG. 5–6, a cap 1c of a seal assembly 10c has an elongated interior opening 28 for receiving an extended portion 30 of the body B' of a connector bolt C'''. Thus, the cap 1c is useful for sealing and/or protecting bolts having a non-specific length body for general purpose applications and to obviate the need for cutting the extending end. As seen in FIG. 5, the washer 18 abuts the engagement surface S. As seen in FIG. 6, the washer 18 can be sandwiched between the inner nut N and an outer nut N' to obviate the need for unfastening an existing connector for installing the washer 18. Thus, the present cap 1c can be simply installed on an existing screw or bolt which cannot be easily unfastened to install the washer 18.

Figure 7:
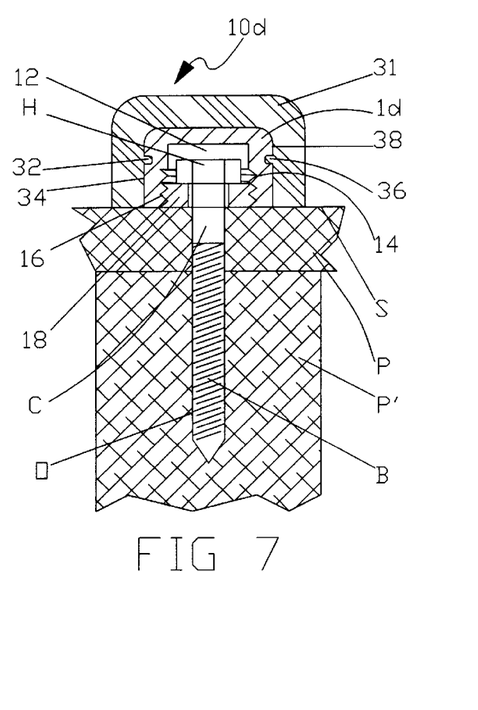
FIG. 7 shows a cross-sectional view of yet a further embodiment of the seal connector assembly of the present invention, with a protective cover of rubber or plastic attached to the seal cap.

In another embodiment, any of the caps 1, 1a, 1b, 1c of the present invention can include a protective outer sheath or cover 31 as seen in FIG. 7. Thus, the present cap 1b, for example, is provided with a radial groove 32 formed on an outside surface 34 to give a cap 1d of an assembly 10d suitability for receiving a radial tongue 36 formed on an inside surface 38 of the sheath 31. The sheath 31 is preferably made of a rubber or a soft plastic material. The sheath 31 when made of rubber can be affixed to the cap 1d to form a protective surface therefor.

Figure 7A:
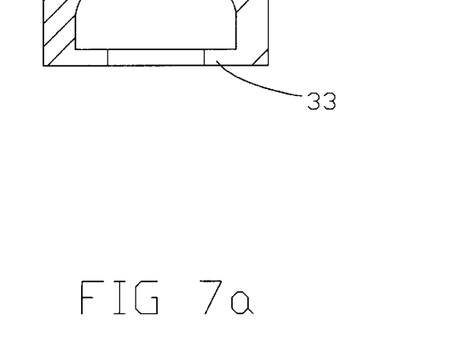
FIG. 7a shows a cross-sectional view of a protective rubber cover having a radial inside lip for attaching the cover to the cap and sealing the cap at the engagement surface.

As seen in FIG. 7a, the rubber or soft plastic sheath 31 can comprise a radially inwardly extending lip 33 formed on the bottom surface thereof to give a sheath 31'. In the practice of the present invention, when the sheath 31' is attached to the cap 1b, for example, the lip portion 33 compresses as the cap 1b is attached and tightened on the threaded washer 18 thus forming a seal around the lower edge of the seal cap.

Figure 7B:
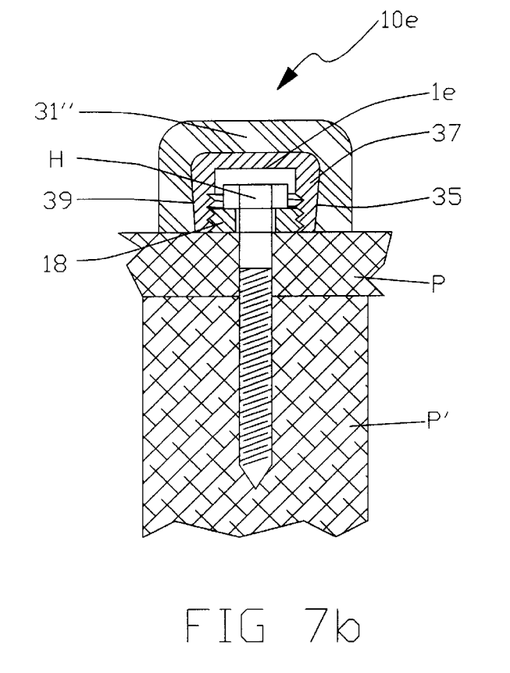
FIG. 7b shows a variation of the embodiment of FIG. 7 wherein seal cap has a tapered exterior diameter and the rubber cover has a correspondingly tapered interior diameter for simply and securely attaching the rubber cover to the seal cap.

In a further embodiment 10e as seen in FIG. 7b, the cap 1b can comprise an inwardly tapered exterior diameter 35 to give a cap 1e with a knob 37 for insertion into a suitable sheath 31" having a tapered interior diameter 39. In the manner of the present invention, the sheath 31" is securely attached to the cap 1e at the knob 35.

Alternative methods of attaching the protective sheath to the cap of the present invention will occur to those skilled in the art and are within the spirit and scope of the present invention.

Caps with a rubberized outer surface are particularly useful when used in close, frequent contact with a relatively soft surface such as wood, plastic, polymer composites, glass, textile, and the like such as for example when used as wear-feet of furniture such as desks and chairs, or as floor mounted door stops.

Figure 8:
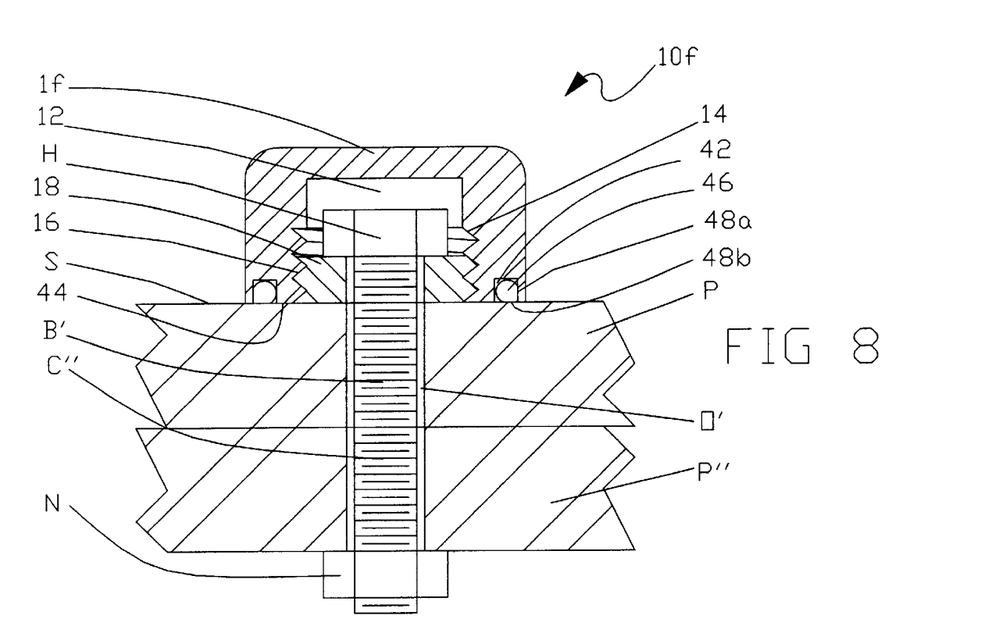
FIG. 8 shows a cross-sectional view of yet another embodiment of the seal connector assembly of the present invention, wherein the seal cap comprises an o-ring gasket and the gasket is deformed to seal internal pressure on the connector.
Figure 9:
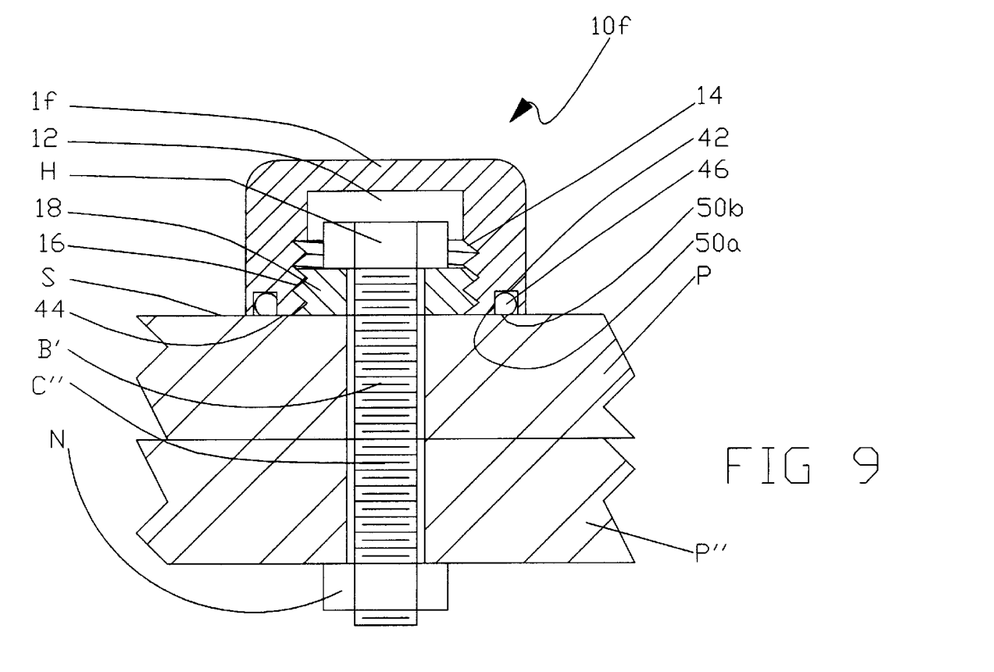
FIG. 9 shows a cross-sectional view of the seal connector assembly of FIG. 8 wherein the seal cap comprises an o-ring gasket and the gasket is deformed to seal external pressure on the connector.

For enhanced sealing capacity in pressurized sealing applications, the present cap 1b, for example, can be provided an o-ring gasket pressure seal. As seen in FIGS. 8–9, a cap 1f of a pressure seal assembly 10f includes a channel 42 in an end surface 44 abutting the engagement surface S. The channel 42 is fitted with a suitable o-ring 46. When the present seal cap 1f is properly installed, the o-ring 46 deforms to produce active seal surfaces 48a, 48b in response to internal pressure (FIG. 8) or active seal surfaces 50a, 50b in response to external pressure (FIG. 9).

An unexpected feature of this invention is that finger tightness is enough to seal against large pressures using the active o-ring type seal. Further, if a connector in corrosive service is sealed from the outside with an o-ring cap of the present invention, and the corrosives have a gradual corrosive effect even on the sealing cap, the corrosives can be drained away from the cap, and the cap can then be replaced with a fresh sealing cap without loosening the fastener. In this way the life and installation of an expensive high strength fastener may be extended indefinitely where previously the fastener would have to be replaced at regular intervals due to corrosion.

Figure 10:
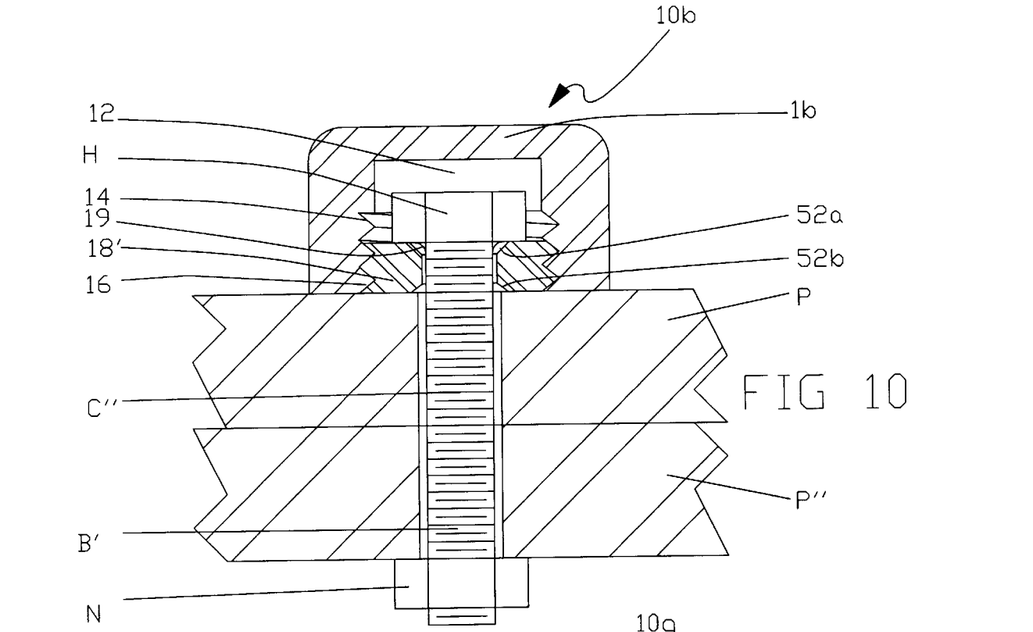
FIG. 10 shows a cross-sectional view of the seal connector assembly of FIG. 4, wherein the washer includes upper and lower chamfered edges.

In certain applications, wherein the connector C is under a force great enough to deform the washer 18, one or more chamfered edges 52a, 52b can be formed on a washer 18' to enhance force distribution thereof as seen in FIG. 10. In addition, chamfers are used to provide clearance for the fillets 19 typically seen under the head of a bolt or screw to provide stress relief. Using chamfers allows the diameter of a hole in the washer 18' to be reduced and provides more accurate centering of the washer under the head of the bolt/screw for more accurate load and stress distribution.

Figure 11:
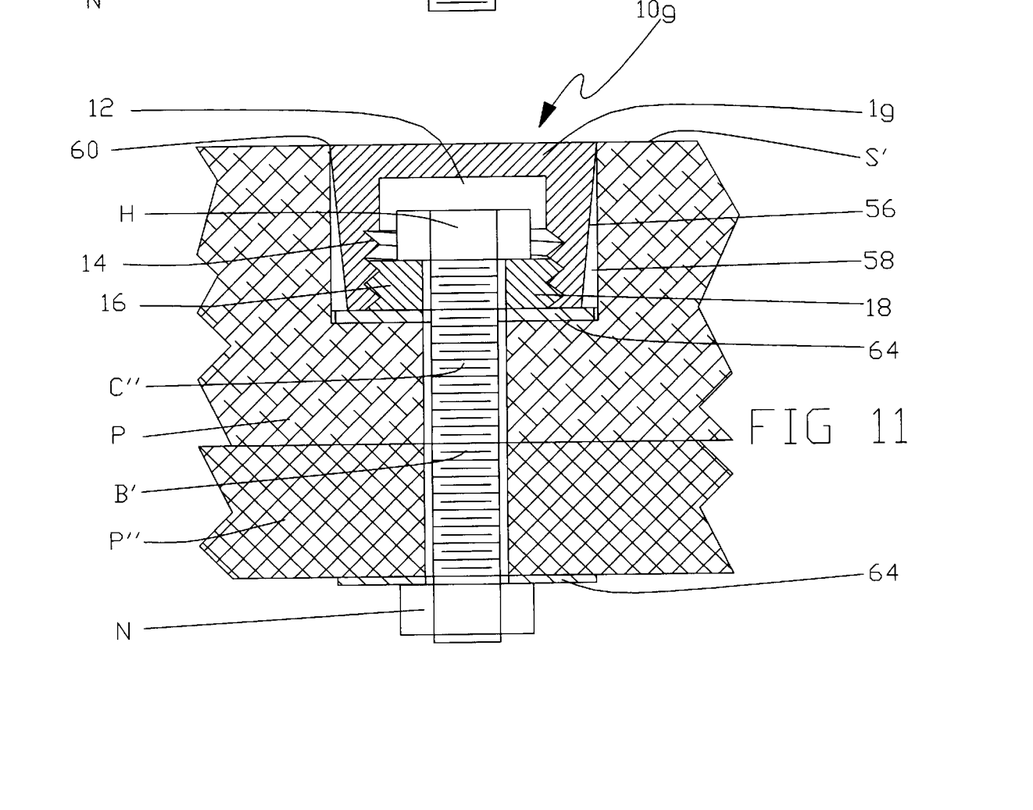
FIG. 11 shows a cross-sectional view of the seal connector assembly of FIG. 2, wherein the seal cap is tapered and embedded in a counterbore formed on the connection surface so that the cover has a low or flush profile with respect to the surface.

Any of the caps 1, 1a, 1b, 1c, 1d, 1e, 1f of the present invention can be used in low/flush profile with respect to an engagement surface S' as seen in FIG. 11. The cap 1, for example, can have an outer diameter 56 tapered inwardly along the axis to form a cap 1g of an assembly 10g. The cap 1g is received in a well 58 bored into the surface S' so that an outer edge 60 of the cap 1g abuts the edge of the well 58. The taper is to assure a tight and centered fit in the Surface S while minimizing tightening torque.

Figure 14:
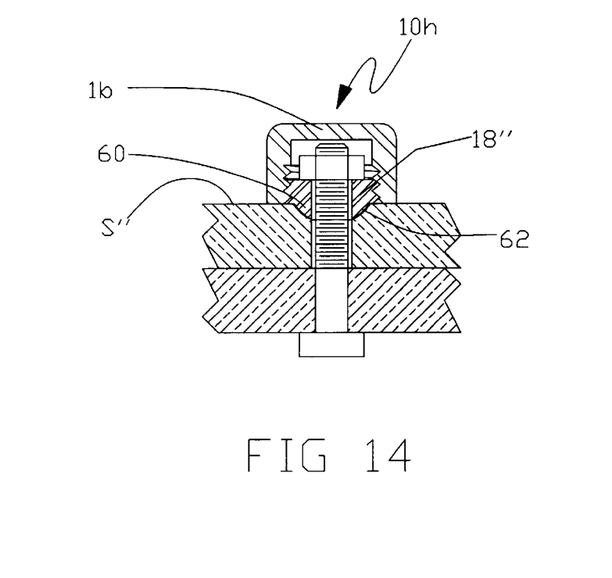
FIG. 14 shows a cross-sectional view of a variation on the seal connector assembly of FIG. 4, wherein the washer has an axially extending tapered or spherical protrusion and the connection surface has a corresponding or mating tapered or spherical pocket for receiving the washer protrusion similar or identical to the mating surfaces between a lug nut and an automobile wheel rim.

In another embodiment 10h of the present invention, a washer 18" comprises an axially extending tapered or spherical protrusion 60 as seen in FIG. 14 and the protrusion 60 is received by a suitable tapered or spherical pocket 62 formed in a connection engagement surface S" so that a centered fit is formed by seating the protrusion 60 in the pocket 62 when the bolt is attached, identical to the centered fit between lug nuts and wheel rims in automobiles. The seal cap 1b is then attached to the washer 18".

Figures 12, 13:
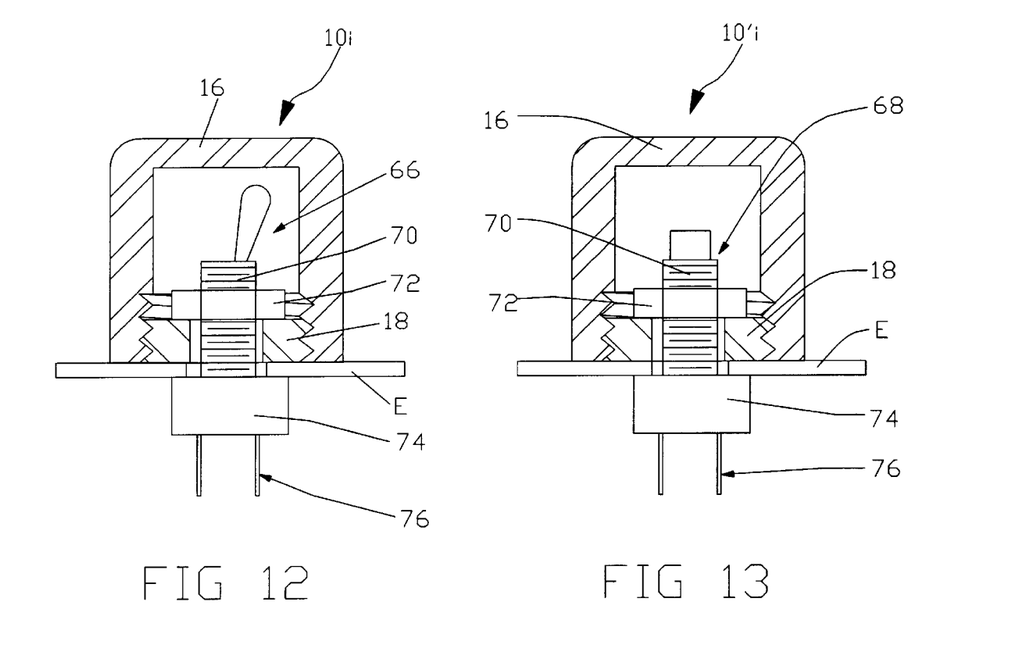
FIG. 12 shows a cross-sectional view of the seal cap of the present invention used to seal and/or guard a toggle switch.
FIG. 13 shows a cross-sectional view of the seal cap of FIG. 12, used to seal and/or guard a push button switch.

Any of the seal caps 1, 1a, 1b, 1c, 1d, 1e, 1g of the present invention can be used as covers for an electronic switch installed in a support and engagement panel E as seen in FIGS. 12–13. In a further embodiments 10i, 10'i, the seal cap 1b is attached to a washer 18 to protect an electronic switch such as, for example, a toggle switch 66 or a push button switch 68 having a threaded body 70, a nut 72, a circuit 74 and electrodes 76. The construction, installation and operation of such switches is well known in the art.

Any of the caps 1, 1a, 1b, 1c, 1d, 1e, 1g of the present invention can be used by installing by hand to engage the threads 16 of the washer 18, 18' since hand applied force is typically suitable for most applications. However, hand operated tools and power tools can also be used, if desired. Therefore, any of the well known recesses (not shown) can be formed on the cap 1 to assist a tool such as a flat head screwdriver, Phillips head screwdriver, Allen wrench, and the like. However, hand engaged force is typically all the force required to install the present caps to connectors including those caps having o-ring seals.

While the washer 18, 18' will typically be attached to the screw or bolt under the head thereof as shown in the FIGS. 1–5, 7–11, the washer 18, 18' can be attached to the connector between a pair of nuts N, N' (as seen in FIG. 6) in which case, the cap 1b of the present invention is attached to the nut end of the bolt and the cap has an extended shape suitable for receiving the bolt extended portion 30 and the thread surface 14 extends sufficient distance to attach the washer 18, 18' and seal the connector. In addition to the washer 18, 18', connectors sealed by the present invention can employ one or more other types of standard washers 64 (i.e. lock washer, centering washer, and the like, as seen in FIG. 11) which do not have an outside threaded surface.

The present caps 1, 1a, 1b, 1c, 1d, 1e, 1f, 1g can made of metallic and plastic materials including steel, copper, aluminum, polyethylene, polypropylene, and the like. In carpentry applications, the cap can be made of wood, plastic or metal. Typically, a cap will be made of the same type of material as the washer and bolt being sealed, however, this is not required, such as for example, a wood or plastic cap can be used to seal a steel screw using a steel or plastic washer.

The present caps 1 are typically made by turning on a lathe, stamping, molding, and the like processes well known in the art. The washer 18 can be very simply made from all-thread bar stock cut into sections of suitable thickness and then drilling a hole through the center. All-thread is generally available in metallic, wooden and plastic lengths as required.

The present caps 1, 1a, 1b, 1c, 1d, 1e, 1f, 1g can be used in any application wherein it is desired to seal an end of a connector or fastener including screws, bolts and the like connector means. Such seal applications can be environmentally geared to minimize corrosion and dirt access around the connector, for protection purposes to prevent the bumping and scraping of sharp bolt surfaces, for ornamentation to limit or eliminate vision of an otherwise unsightly screw, for example, and in chemical and physical processes to prevent leaks around bolts used on pressurized or vacuum lines and vessels and/or lines and vessels containing corrosive, poisonous and the like dangerous materials.

For example, the present invention is useful for retarding corrosion on bolts used in marine environments such as aboard ships, on piers, and the like. Some stainless steel and high strength metal fasteners used in marine applications are commonly subject to chloride corrosion and stress cracking. The present invention can be used to seal connectors from salt water spray. If a connector used in a marine environment is sealed against salt water with an o-ring sealed cap of the present invention, and the salt water has a gradual corrosive effect on the sealing cap, the cap can be changed periodically without loosening the fastener thus extending the operational life of an expensive, hard to replace fastener. In such a manner, the integrity of the fastener can be extended almost indefinitely wherein a previously regular replacement schedule might have been needed (due to corrosion). Further, the cap of the present invention could even be made of a sacrificial material such as zinc so the cap would preferentially corrode while leaving the fastener and threaded washer intact.

The present invention caps can be used in protecting people from bolt and screw heads protruding from machinery, such as for example, screw heads and nuts protruding from exercise equipment. Such equipment has a relatively high bump hazard and the plastic snap-in covers currently used by some manufacturers can break or pop-off leaving metal bump hazards which can cause injuries. Further, the present caps can be tightly screwed down (beyond finger tight) using a tightening tool or held on using a thread locking means so that the present invention caps can not be unintentionally removed. Also the present caps and threaded washers can be used with a thread locking compound to prevent screws and nuts from being intentionally loosened or to permanently lock them on.

The present invention caps can be used to hide the presence of bolted connections in architectural and structural purposes such as manufacture of buildings, and furniture (hardware and prefab connections); plumbing, (hardware connections), garment racks and other store fixtures, and the like ornamentation and safety purposes.

The bolt heads and nuts can be permanently covered by assembling the structure in the usual fashion except that threaded washers are used under the exposed bolt heads of nuts. The bolts and nuts can be preloaded to their full strength without excessively deforming the threaded washers. The caps of the present invention can be tightly screwed onto the threaded washers (beyond finger tight). The present caps would thus aesthetically cover unsightly nut and screw ends and also serve as bump protection guards. This application is especially useful in modern structures which use high strength screws and bolts instead of rivets.

As a further architectural/structural use, covering materials such as granite, marble, brass, aluminum, etc. plates or panels can be bolted in place and appropriate decorative covers can be screwed on to give a finished appearance.

The present caps can be used as wear-feet for tables, desks, chairs, and the like furniture and equipment with or without the rubber sheath 31. The present caps can be made very strong in the case of very heavy equipment mounted on tables used, for example, in assembly lines of manufacturing plants. Other similar type uses include door stops that can be screwed to the floor with a single screw.

Use of the present invention caps is a simple way to make any standard threaded connection gas and/or fluid-tight. Instrumentation, for example, can be bolted directly to the surface of thin walled vessels and tanks using the present invention caps to seal the ends of the bolts or screw that extend through the vessel wall to hold instrumentation in place. In the absence of prefabricated vessel/tank flange connections, the bolt pattern can be drilled directly into the vessel/tank wall (in situ) and the instrument can then be bolted using the present seal caps to seal the bolts or studs.

If an analysis of the connection indicates that stress is not a problem, the present seal caps can be used inside the vessel wall to stop leaks around flange bolt or screw threads that protrude through the vessel wall. The flange can be tightened in the usual fashion to compress a gasket into the outside wall of the vessel to form a leak-proof connection The foregoing description of the invention is illustrative and explanatory thereof. Various changes in the material, apparatus, and particular parts employed will occur to those skilled in the art. It is intended that all such variations within the scope and spirit of the appended claims be embraced thereby.

What is claimed is:

1. A seal cap and connector assembly, said connector having at least one end projecting from an engagement surface, comprising: (a) a cap having a hollow interior space for receiving said projecting end, and a threaded inside surface; and (b) a washer attached to the connector at said projecting end having a threaded outside surface for engaging said threaded inside surface of the cap; (c) a seal gasket received in a groove formed in the cap, wherein the projecting end has a threaded body extending through first and second nuts and said washer is attached to the extending body between the nuts.

2. A seal cap and connector assembly, said connector having at least one end projecting from an engagement surface, comprising: (a) a cap having a hollow interior space for receiving said projecting end, and a threaded inside surface; and (b) a washer attached to the connector at said projecting end having a threaded outside surface for engaging said threaded inside surface of the cap, wherein the cap is received by a well or counter-bore formed in said engagement surface.

3. A seal cap and connector assembly, said connector having at least one end projecting from an engagement surface, comprising: (a) a cap having a hollow interior space for receiving said projecting end, and a threaded inside surface; (b) a washer attached to the connector at said projecting end having a threaded outside surface for engaging said threaded inside surface of the cap; and (c) a rubber or plastic sheath affixed to an exterior surface of said cap.

4. The connector assembly of claim 3, wherein the sheath extends below a lower edge of the cap.

5. The connector assembly of claim 3, wherein the sheath includes a radially projecting tongue formed on an inside surface thereof for attaching the sheath to the cap.

6. The connector assembly of claim 3, wherein the sheath includes a radially extending inside lip formed on a bottom edge thereof for attaching the sheath to the cap and forming a seal between said cap end surface and said engagement surface when the cap is tightened.

7. The connector assembly of claim 3, wherein said cap comprises a tapered exterior diameter and said sheath comprises a suitably tapered interior diameter for securely attaching the sheath to the cap.

8. A seal cap and connector assembly, said connector having at least one end projecting from an engagement surface, comprising: (a) a cap having a hollow interior space for receiving said projecting end and a threaded inside surface; (b) a washer attached to the connector at said projecting end having a threaded outside surface for engaging said threaded inside surface of the cap; and (c) a metallic split-ring locking ring disposed adjacent to the threaded washer for locking the threaded washer in place.

9. The connector assembly of claim 8, wherein the metallic locking ring comprises teeth disposed thereon to lock the threaded washer.

* * * * *